(12) United States Patent
Tsubouchi et al.

(10) Patent No.: US 6,367,889 B1
(45) Date of Patent: Apr. 9, 2002

(54) BRAKE CONTROL DEVICE

(75) Inventors: Kaoru Tsubouchi, Toyota; Akihiko Miwa, Anjo, both of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/666,789

(22) Filed: Sep. 21, 2000

(30) Foreign Application Priority Data

Sep. 21, 1999 (JP) .......................................... 11-267039

(51) Int. Cl.$^7$ ................................................ B60T 8/34
(52) U.S. Cl. ................................. 303/113.4; 303/114.3
(58) Field of Search .......................... 303/113.1, 113.3, 303/113.4, 114.3, 155, 22.1, 198

(56) References Cited

U.S. PATENT DOCUMENTS

| | | | | |
|---|---|---|---|---|
| 4,512,615 A | * | 4/1985 | Kita et al. .................... | 303/155 |
| 4,674,804 A | * | 6/1987 | Burgdorf et al. ............ | 303/9.69 |
| 5,445,444 A | * | 8/1995 | Rump et al. .............. | 303/113.4 |
| 5,833,327 A | * | 11/1998 | Kozakai .................. | 303/113.4 |
| 5,967,624 A | * | 10/1999 | Graber et al. ............ | 303/113.4 |
| 6,033,037 A | * | 3/2000 | Eckert ..................... | 303/114.3 |

FOREIGN PATENT DOCUMENTS

JP                60-78849             5/1985

* cited by examiner

Primary Examiner—Christopher P. Schwartz
Assistant Examiner—Mariano Sy
(74) Attorney, Agent, or Firm—Burns, Doane, Swecker & Mathis, LLP

(57) ABSTRACT

A brake control device includes a pressurization device having a first pressurization device for pressurizing the brake fluid supplied to wheel brakes in response to the driver's operation and a second pressurization device for pressurizing the brake fluid supplied to the wheel brakes independently of the driver's operation; a first detecting device for detecting a displacement of an input member of the pressurization device or an output pressure of the pressurization device; a second detecting device for detecting the condition of the vehicle; and a control device for memorizing relationships between a driving signal of the second pressurization device and the displacement of the input member or relationships between a driving signal of the second pressurization device and the output pressure of the pressurization device as control maps corresponding to the variety of the condition of the vehicle and for controlling the driving signal of the second pressurization device on the basis of the control map in response to the value detected by the first detecting device and the condition of the vehicle detected by the second detecting device.

2 Claims, 4 Drawing Sheets

BRAKE CONTROL DEVICE

This application is based on and claims priority under 35 U.S.C. §119 with respect to Japanese Patent Application No. 11(1999)-267039 filed on Sep. 21, 1999, the entire content of which is incorporated herein by reference.

FIELD OF THE INVENTION

The present invention generally relates to a vehicle brake system. More particularly, the present invention pertains to a brake control device for a vehicle provided with pressurization mechanisms for pressurizing brake fluid supplied to the wheel brakes in response to the driver's operation and independently of the driver's operation.

BACKGROUND OF THE INVENTION

A known vehicle brake control device is disclosed in Japanese Patent Laid-Open Publication No. 60(1985)-78849. This brake control device includes a vacuum booster having a solenoid, a depressing force sensor for detecting the depressing force of the brake pedal, a deceleration sensor for detecting the deceleration of the vehicle, and a control device. The solenoid is disposed in a housing of the vacuum booster and operates independently from the brake operation member. The depressing force sensor is disposed on the input axis of the vacuum booster and detects the depressing force as an operating force of the brake pedal. In this device, even though the condition of the vehicle such as the carrying weight is changed, if the depressing force is constant, the solenoid is controlled by the control device so that the predetermined target deceleration of the vehicle is always obtained. In other words, the solenoid is controlled by the control device under feedback control. As a result, the relationship between the depressing force of the brake pedal and the deceleration of the vehicle is maintained constant.

With this known brake control device, the depressing force sensor for correctly detecting the depressing force of the brake pedal is indispensable for feedback control. Because the depressing force sensor is expensive due to its rather complicated structure, the manufacturing cost of the brake control device is increased.

Moreover, in this known brake control device, a variety of vehicle conditions such as the carrying weight cause an increase of the operating force of the pedal.

In light of the foregoing, a need exists for a vehicle brake control device which overcomes the above drawbacks.

It would thus be desirable to provide a vehicle brake control device which can reliably produce a braking force in response to changes in the vehicle condition without using a depressing force sensor and feedback control.

SUMMARY OF THE INVENTION

The brake control device of the present invention includes a pressurization device having a first pressurization mechanism for pressurizing brake fluid supplied to wheel brakes in response to the driver's operation and a second pressurization mechanism for pressurizing the brake fluid supplied to the wheel brakes independently of the driver's operation, a first detecting mechanism for detecting the displacement of an input member of the pressurization device or an output pressure of the pressurization device; a second detecting mechanism for detecting the condition of the vehicle, and a control device for memorizing relationships between a driving signal of the second pressurization mechanism and the displacement of the input member or relationships between a driving signal of the second pressurization mechanism and the output pressure of the pressurization device as control maps corresponding to variations in the condition of the vehicle. The control device also controls the driving signal of the second pressurization mechanism on the basis of the control map in response to the value detected by the first detecting mechanism and the condition of the vehicle detected by the second detecting mechanism.

The control device selects a control map corresponding to the condition of the vehicle detected by the second detecting mechanism and controls the driving signal of the second pressurization mechanism on the basis of the selected control map in response to the value detected by the first detecting mechanism. Therefore, the output of the pressurization device can be controlled variably without using a depressing force sensor and feedback control in response to the condition of the vehicle.

It is preferable that the control device output a predetermined driving signal to the second pressurization mechanism when the control device judges that the brake is not operated by the driver, with the control device correcting the target relationship according to the detected value by the first detecting mechanism at this time. The control device can thus correctly control the second pressurization mechanism even if leakage of brake fluid, wear of a brake pad or wear of a mechanical portion occurs.

It is preferable that the pressure device include a vacuum brake booster with an actuator. In this way, the input-output ratio of the pressurization device having the vacuum brake booster can be changed by driving the actuator as the second pressurization mechanism.

The second pressurization mechanism is preferably comprised of a modulator which draws in brake fluid from a master cylinder and pressurizes the wheel brakes. The input-output ratio of the pressurization device can thus be changed by driving the modulator as the second pressurization mechanism.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
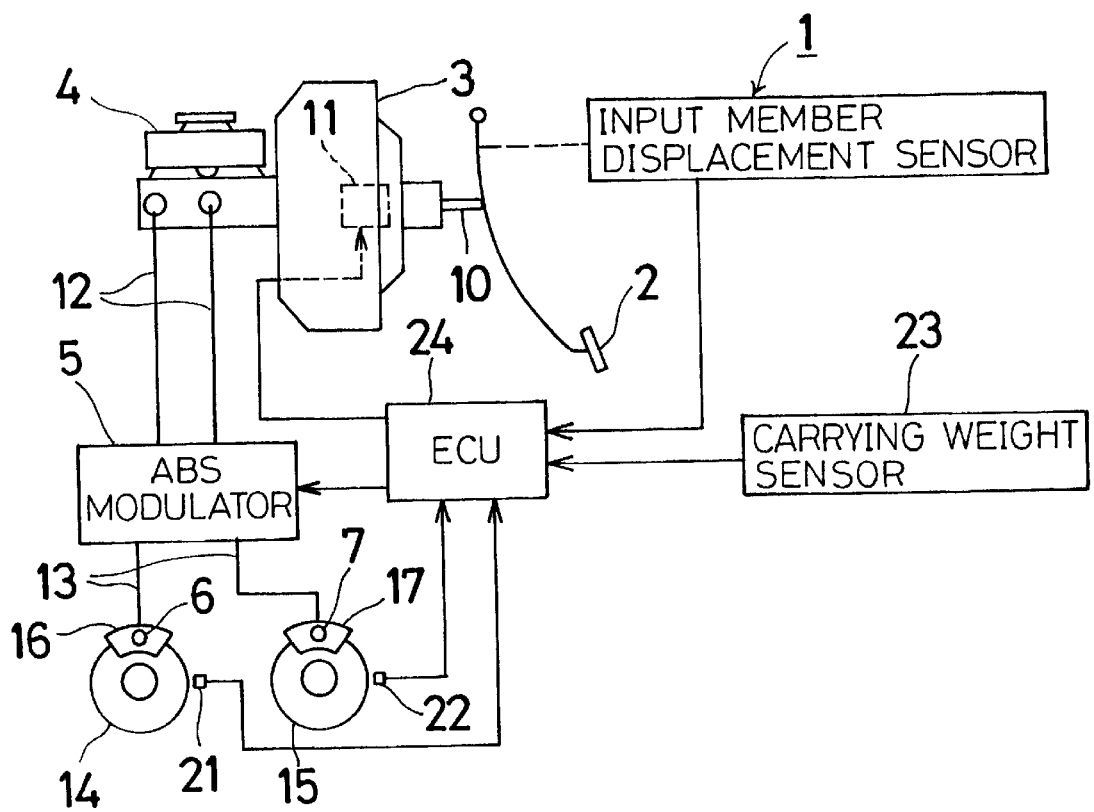
FIG. 1 is a schematic illustration of a brake control device in accordance with a first embodiment of the present invention.

Referring initially to FIG. 1, the brake control device 1 according to a first embodiment of the present invention is mainly comprised of a brake pedal 2, an active brake booster 3 operating as the pressurization device and the first pressurization mechanism or first pressurization means, a solenoid 11 operating as the second pressurization mechanism or second pressurization means and the actuator, a master cylinder 4 operating as the first pressure device, several wheel cylinders 6, 7, an electronic control unit (ECU) 24 operating as the control device, an input member displacement sensor 20 operating as the first detecting mechanism or first detecting means and a carrying weight sensor 23 operating as the second detecting mechanism or second detecting means.

An input rod 10 of the active brake booster 3 is connected with the brake pedal 2. The pedal force applied to the brake pedal 2 is transmitted to the active brake booster 3 through the input rod 10.

The active brake booster 3 according to this first embodiment is a vacuum brake booster which generates an amplified output pressure using a differential between atmospheric pressure and a negative pressure of the engine intake, and outputs the amplified output pressure to the master cylinder 4 in proportion to the pedal force. The active brake booster 3 includes a solenoid 11 functioning as the actuator.

The electronic control unit (ECU) 24 operates the solenoid 11 independently from the braking operation of the driver to generate an additional pressure added to the amplified pressure. As a result, the pressure of the active brake booster 3 which is the sum of the amplified pressure and the additional pressure can be variably controlled by the electronic control unit (ECU) 24.

The output pressure of the active brake booster 3 transmitted to the master cylinder 4 generates a hydraulic pressure of the master cylinder 4 according to the pressure. The master cylinder 4 is connected with the ABS modulator 5 through fluid paths 12. The ABS modulator 5 is connected to the wheel cylinder 6 which is operatively associated with the front wheel 14 and is connected to the wheel cylinder 7 which is operatively associated with the rear wheel 15 through respective fluid paths 13. Thus, brake fluid pressurized by the master cylinder 4 is applied to the wheel cylinders 6, 7 through the ABS modulator 5, and the wheel cylinders 6, 7 thus brake the front wheel 14 and the rear wheel 15 respectively.

The displacement "S" of the input rod 10 corresponding to the displacement of the brake pedal 2 is detected by the input member displacement sensor 20 disposed on the brake pedal 2. The displacement "S" of the input rod 10 increases when the depressing force "F" is increased. In this first embodiment, when the driving current "i" of the solenoid 11 is increased, the displacement "S" of the input rod 10 increases.

A front wheel speed sensor 21 operatively associated with the front wheel 14 detects the front wheel speed and a rear wheel speed sensor 21 operatively associated with the rear wheel 14 detects the rear wheel speed. The ABS modulator 5 is controlled according to the front and rear wheel speeds and thus applies a braking force to the front and rear wheels.

A carrying weight sensor 23 is disposed between the front and rear wheels 14, 15 and the vehicle body to detect variations in the vehicle height according to the carrying weight. The sensors 20, 21, 22, 23 are connected to the electronic control unit (ECU) 24 so that signals from these sensors 20, 21, 22, 23 are conveyed to the electronic control unit (ECU) 24.

The brake pedal 2, the active brake booster 3 and the master cylinder 4 correspond to or constitute the pressurization device. The active brake booster 3 and the master cylinder 4 correspond to the first pressurization mechanism or first pressurization means, and the solenoid 11 in the active brake booster 3 constitutes the second pressurization mechanism or second pressurization means.

The electronic control unit (ECU) 24 includes well known components such as a CPU, ROM and RAM. The electronic control unit (ECU) 24 controls the solenoid 11 and the ABS modulator 5 according to signals received from the sensors 20, 21, 22, 23. The braking force applied to the wheels 14, 15 is thus appropriately modulated and wheel lock is prevented.

Figure 2:
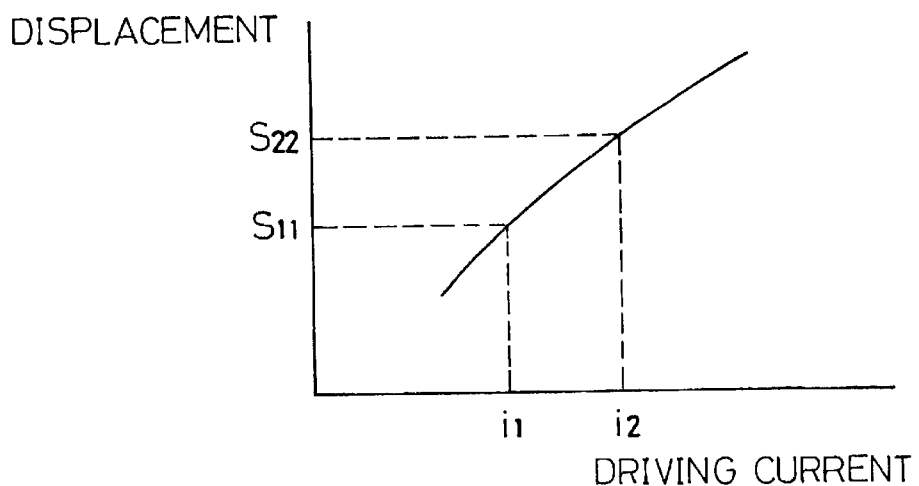
FIG. 2 is a graph showing the target relationship between the value of current as a driving signal to the second pressurization mechanism and the displacement of the input member of the pressurization device for the device illustrated in FIG. 1.
Figure 3:
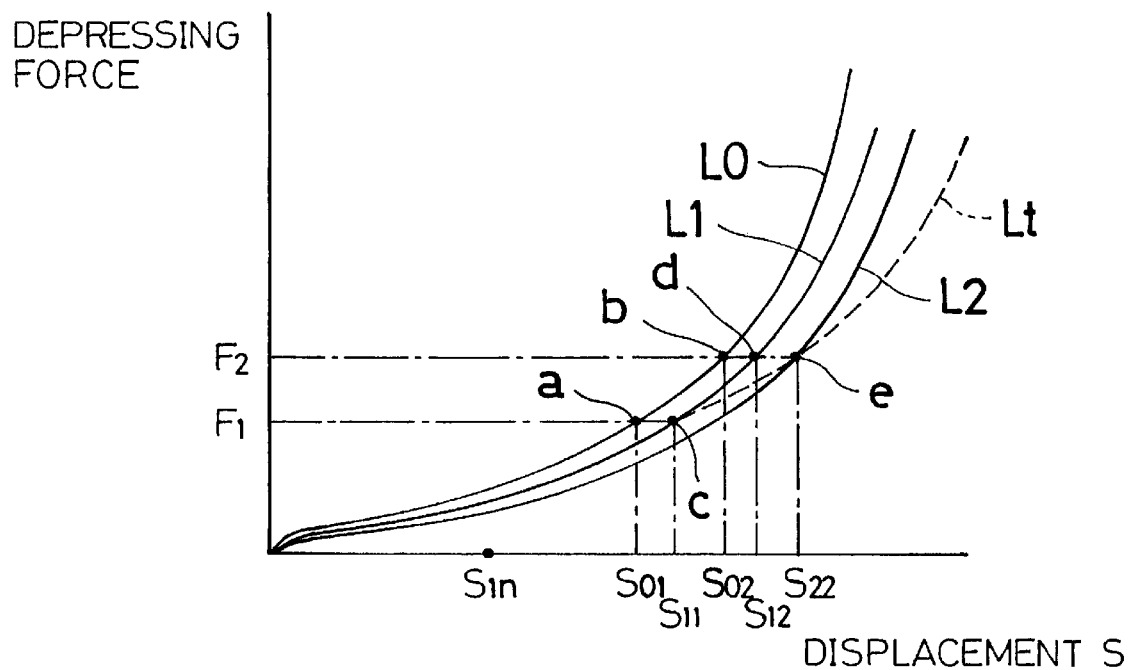
FIG. 3 is a graph showing the relationship between the displacement of the input member of the pressurization device and the depressing force for the device illustrated in FIG. 1.
Figure 4:
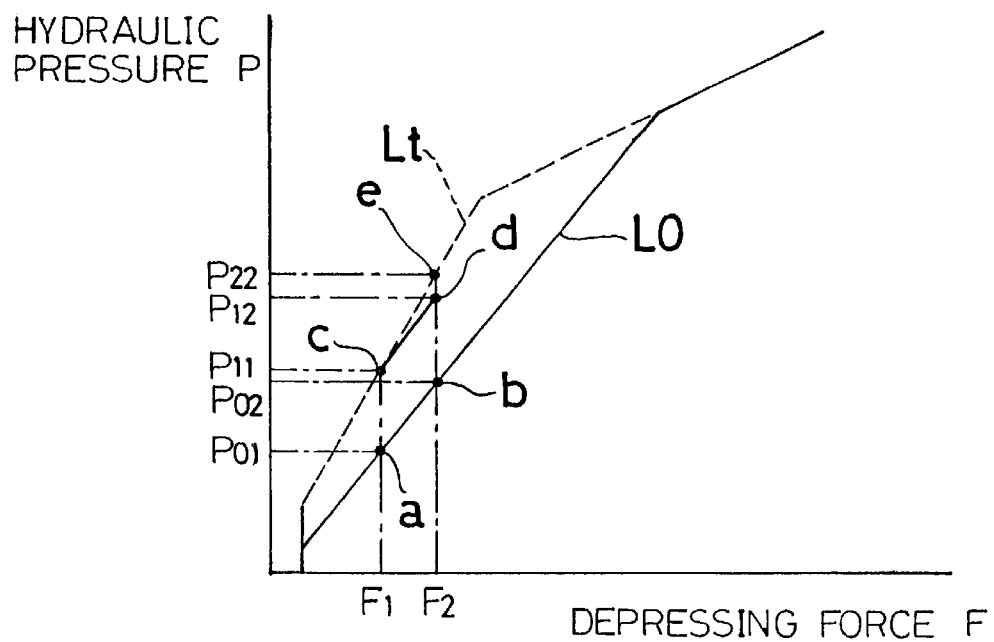
FIG. 4 is a graph showing the relationship between the depressing force and the output hydraulic pressure of the pressurization device.

In the embodiment of the invention shown in FIGS. 2–4, the ratio of hydraulic pressure of the pressurization device to the depressing force (target input-output ratio) is changed in accordance with the carrying weight. This ratio is set relatively large if the carrying weight is heavy and is set relatively small if the carrying weight is light.

FIG. 2 illustrates a control map of the target relationship between the driving current "i" of the solenoid 11 and the displacement "S" of the input rod 10 under the condition that the carrying weight is a predetermined weight. The electronic control unit (ECU) 24 memorizes a plurality of such control maps corresponding to a variety of different carrying weights of the vehicle. The control map shown in FIG. 2 is used when the carrying weight is of a certain amount and the other control maps are used if the carrying weight varies from this amount.

FIG. 3 is a graph illustrating the relationship between the displacement "S" of the input rod 10 and the depressing force "F" applied by the driver. The curve "L0" in FIG. 3 shows the relationship between displacement "S" and depressing force "F" under the condition that the driving current "i" of the solenoid 11 equals "0" (zero). The curve "L1" shows the relationship between displacement "S" and depressing force "F" when the driving current "i" of the solenoid 11 equals "i1". The curve "L2" shows the relationship between displacement "S" and depressing force "F" under the condition that the driving current "i" of the solenoid 11 equals "i2".

FIG. 4 is a graph illustrating the relationship between the depressing force "F" and the hydraulic pressure "P" of the pressurization device. The curve "L0" in FIG. 4 shows the relationship between depressing force "F" and hydraulic pressure "P" of the pressurization device under the condition that the driving current "i" of the solenoid 11 equals "0" (zero).

The curve "Lt" in FIG. 3 shows the relationship between displacement "S" and depressing force "F" under the condition that the driving current "i" of the solenoid 11 is controlled under the target relationship shown in FIG. 2. Similarly, the curve "Lt" in FIG. 4 shows the relationship between depressing force "F" and hydraulic pressure "P" of the pressurization device under the condition that the driving current "i" of the solenoid 11 is controlled under the target relationship shown in FIG. 2. Namely, because the hydraulic pressure along the curve "Lt" in FIG. 4 has to be generated in response to the depressing force F under the predetermined carrying weight, the driving current "i" of the solenoid 11 is controlled so as to satisfy the target relationship shown in FIG. 2. At the same time, as show by the curve "Lt" in FIG. 3, the displacement "S" corresponding to the depressing force "F" is detected by the input member displacement sensor 20. As mentioned above, the ROM of the electronic control unit (ECU) 24 memorizes the target relationship shown in FIG. 2 as a control map.

In case of a normal vehicle condition, the driving current "i" of the solenoid 11 equals "0" and the pressure device is controlled under the basic input-output ratio. Namely, the displacement "S" is "S01" when the pedal force "F" is "F1" as shown in FIG. 3, and the hydraulic pressure "P" is "P01" (point "a") when the pedal force "F" is "F1" as shown in FIG., 4. When the pedal force increases to "F2", the displacement "S" moves to "S02" as shown in FIG. 3 and the hydraulic pressure "P" moves to "P02" (point "a"). Therefore, the servo ratio of the active brake booster 3 under the basic input-output ratio is shown as (P02−P01)/(F2−F1).

If the carrying weight of the vehicle increases, the servo ratio of the active brake booster 3 is controlled to be larger than the servo ratio under the normal vehicle condition and the braking effort of the wheel brakes 16, 17 rises or increases. Namely, the servo ratio of the active brake booster 3 is controlled under the target input-output ratio according to the curve "Lt" shown in FIG. 4.

When the depressing force "F" is "F1", the active brake booster 3 is controlled under the target relationship shown in FIG. 2 and the displacement "S" moves from "S01" (point "a" on the curve "L0") to "S11" (point "c" on the curve "L1") shown in FIG. 3. At this time, the solenoid 11 is provided with driving current "i1" and the hydraulic pressure "P" moves from "P01" (point "a" on the curve "L0") to "P11" (point "c" on the curve "Lt") shown in FIG. 4. In this state, if the pedal force "F" increases from "F1" to "F2" by the driver's operation, the displacement "S" moves from "S11" (point "c" on the curve "L1") to "S12" (point "d" on the curve "L1") shown in FIG. 3 and the hydraulic pressure "P" moves from "P11" (point "c" on the curve "L1") to "P12" (point "d" on the curve "Lt") shown in FIG. 4. Further, displacement "S" from "S12" (point "d" on the curve "L1") to "S22" (point "e" on the curve "L2" or "Lt") shown in FIG. 2 and hydraulic pressure "P" comes from "P12" (point "d" on the curve "Lt") to "P22" (point "e" on the curve "Lt" or "L2") shown in FIG. 4 because the solenoid 11 is provided with driving current "i2". Therefore, the servo ratio of the active brake booster 3 under the target input-output ratio is shown as (P22−P11)/(F2−F1) and becomes larger than the basic input-output ratio. Thereafter, the above-mentioned control is repeated at the point "e" as the starting point shown in FIG. 2 or FIG. 3 and the pressure device is controlled under the target input-output ratio.

As mentioned above, control maps providing the target relationships are prepared or stored in the ROM and each control map is prepared according to each target input-output ratio of the pressure device. Therefore, driving current "i" of the solenoid 11 is controlled under another map being different from the control map shown in FIG. 2 when the carrying weight of the vehicle is changed. That is, the servo ratio of the active brake booster 3 is changed in response to the carrying weight of the vehicle and the pressure "P" of the pressurization device is raised.

In this embodiment, an initial check is carried out before the above control. When the driver does not operate the brake pedal, but an ignition switch and an accelerator pedal, the solenoid 11 is provided with predetermined driving current "i" by the electronic control unit (ECU) 24. The electronic control unit (ECU) 24 memorizes an initial displacement "Sin" generated by the predetermined driving current "i" and corrects the target relationship as the control map according to a variety of initial displacements "Sin". As a result, the electronic control unit (ECU) 24 correctly controls the active brake booster 3 even if leakage of brake fluid, wear of a brake pad or wear of a mechanical portion occurs.

The electronic control unit (ECU) 24 judges the driver's intention to brake urgently according to the changing rate of displacement "S" based on the velocity of the input rod 10 so that brake assist control can be carried out.

By virtue of the present invention, the braking force generated by the brake control device 1 can be adequately controlled without using a depressing force sensor which correctly detects pedal force and the feedback control. The braking force can thus be varied or controlled according to the vehicle condition at a relatively low cost. The servo ratio of the active brake booster 3 is changed in response to the carrying weight of the vehicle detected by the carrying weight sensor 23. Thus, the same pedal force generates the same or substantially the same deceleration of the vehicle even if the carrying weight varies. Thus, the driver's intention can be adequately or accurately reflected in the braking force. Further, the braking force for the wheels 14, 15 is modulated according to the vehicle condition and so wheel lock is reliably prevented.

Additionally, the braking force generated by the brake control device 1 can be adequately controlled according to the displacement "S" of the input member detected by the input member displacement sensor 20 so that the braking force can be adequately controlled according to the displacement "S". Further, the input member displacement sensor 20 can detect the changing rate of displacement "S" as the velocity of the input rod 10 and so brake assist control can be carried out.

Further, the control map can be corrected according to the result of an initial check and so the braking force generated by the brake control device 1 can be adequately controlled.

Figure 5:
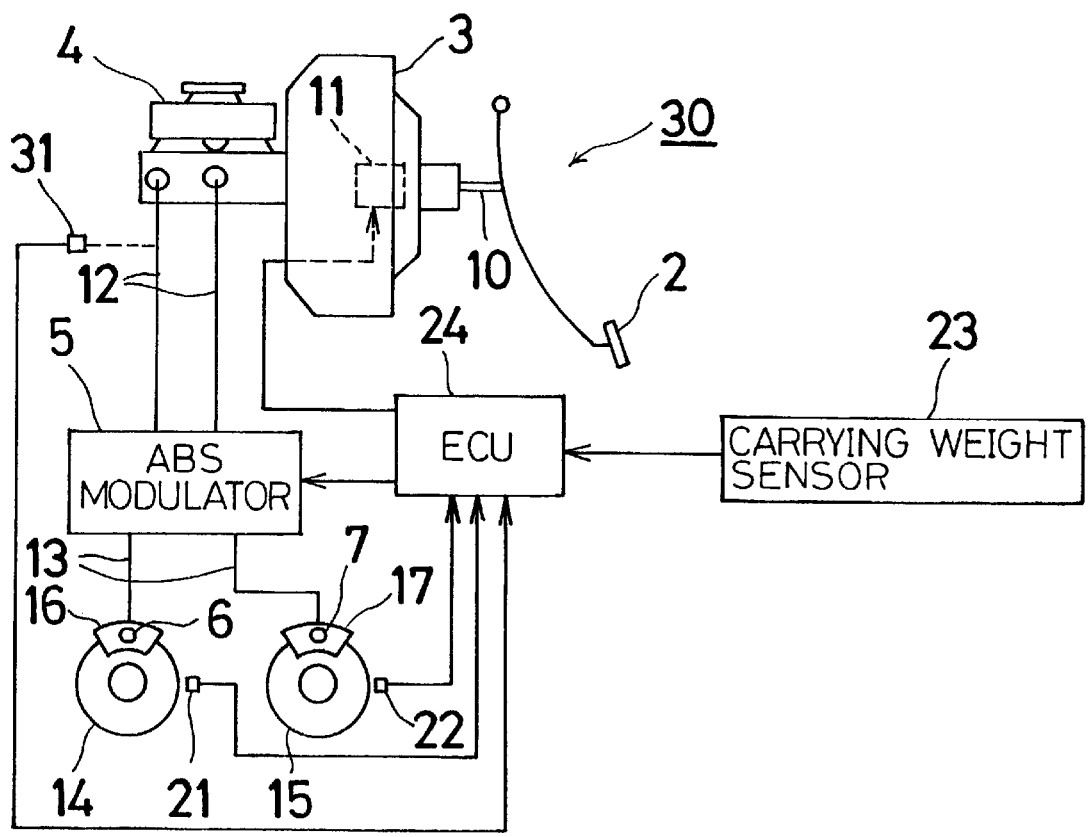
FIG. 5 is a schematic illustration of a brake control device in accordance with a second embodiment of the present invention.
Figure 6:
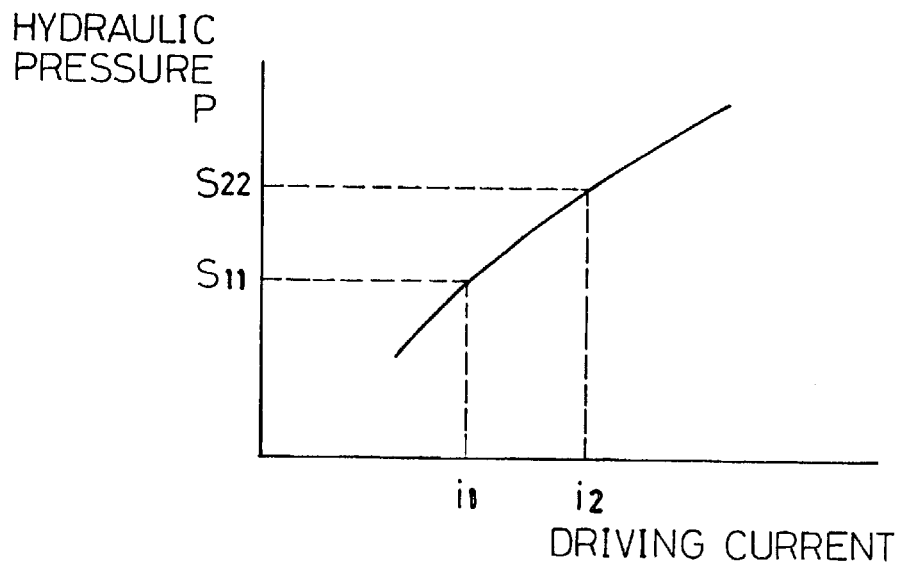
FIG. 6 is a graph showing the target relationship between the value of current as driving signal to the second pressurization mechanism and the output hydraulic pressure of the pressurization device associated with the device illustrated in FIG. 2.

FIGS. 5 and 6 illustrate a second embodiment of the present invention. In this second embodiment, a hydraulic pressure sensor takes the place of the input member displacement sensor 20 employed in the first embodiment. The components in this embodiment that are the same as those in the first embodiment are identified by the same reference numerals and a detailed explanation of such features is not repeated here.

As shown in the schematic illustration of FIG. 5, the brake control device 30 includes a hydraulic pressure sensor 31 serving as the first detector. The servo ratio of the active brake booster 3 is adequately controlled according to an output from the hydraulic pressure sensor 31. Namely, the electronic control unit (ECU) 24 memorizes map data as shown in FIG. 6 and controls the driving current "i" of the solenoid 11 according to target relationships indicated in the map data so that the input-output ratio of the pressurization device is consistent with the target input-output ratio.

With this embodiment of the present invention, as in the embodiment described above, the driver's intention can be adequately or accurately reflected in the braking force, and the braking force for the wheels 14, 15 is modulated according to the vehicle condition so that wheel lock is reliably prevented. Also, the braking force generated by the brake control device can be adequately controlled and brake assist control can be carried out.

Figure 7:
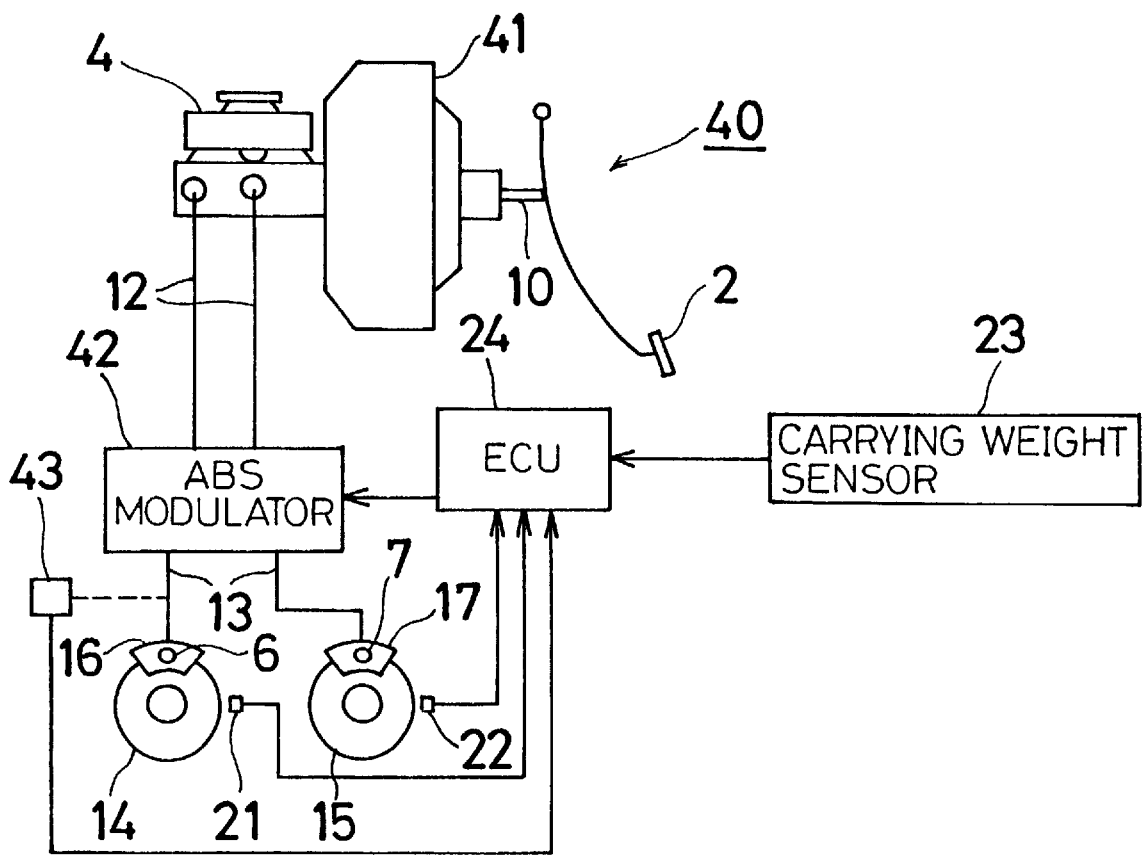
FIG. 7 is a schematic illustration of a brake control device in accordance with a third embodiment of the present invention.

According to a third embodiment of the present invention shown in FIG. 7, the brake control device includes a brake booster without a solenoid that takes the place of the active brake booster 3. Components in this version of the present invention that are the same as those in the above-described embodiments are identified by the same reference numerals and a detailed explanation of such features is not repeated here.

The brake control device 40 includes a brake booster 41 which increases the pedal force "F" under a predetermined servo ratio and transmits the increased pedal force to the master cylinder 4 so that brake fluid in the master cylinder 4 is pressurized according to an output from the brake booster 41 and is drawn in to the ABS modulator 42. The ABS modulator 42 in this embodiment consists of a pressure pump. The pump pressurizes the brake fluid from the master cylinder 4 and transmits the pressurized brake fluid to the wheel cylinders 6, 7. The pressurized brake fluid operates the wheel brakes 16, 17 and the required brake force is obtained. The hydraulic pressure "P" of the brake fluid pressured by the ABS modulator 42 is detected by a hydraulic pressure sensor 43 serving as the first detector.

The electronic control unit (ECU) 24 controls the operation time or driving current of the pressure pump in the ABS modulator 42 so that brake fluid is pressurized. The pressurized brake fluid generates the required brake force to the wheel brakes 16, 17. In this embodiment, the electronic control unit (ECU) 24 memorizes target relationships as map data which show the relationship between the hydraulic pressure "P" and the operation time or driving current of the pressure pump. The operation time or driving current of the pressure pump is then controlled according to the map data so that input-output ratio of the pressure device corresponds to the target input-output ratio.

In this embodiment, the brake pedal 2, the brake booster 41, the master cylinder 4 and the ABS modulator 42 constitute the pressurization device. The brake booster 41 corresponds to the first pressurization mechanism and the ABS modulator 42 corresponds to the second pressurization mechanism.

With this embodiment, advantages similar to those discussed above in connection with the second embodiment can be realized.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A brake control device comprising:

a pressurization device having a first pressurization means for pressurizing brake fluid supplied to wheel brakes in response to a driver's operation and a second pressurization means for additionally pressurizing the brake fluid supplied to the wheel brakes according to a driving current and independently of the driver's operation;

first detecting means for detecting displacement of an input member of the pressurization device;

second detecting means for detecting a carrying weight of the vehicle; and a control device having a plurality of map data defining a relationship between the driving current and the displacement of the input member corresponding to variations in the carrying weight, and the control device controlling the driving current as the displacement of the input member varies on the basis of one of the map data corresponding to the carrying weight detected by the second detecting means so that equal deceleration of the vehicle is obtained by equal operating force of the input member under any carrying weight.

2. The brake control device as claimed in claim 1, wherein the control device outputs a predetermined driving current to the second pressurization means when the control device judges that the brake is not operated by the driver, and corrects the map data according to a shift of the displacement of the input member detected by the first detecting means at this time.

* * * * *